(12) United States Patent
Chi et al.

(10) Patent No.: US 10,396,359 B2
(45) Date of Patent: Aug. 27, 2019

(54) METHOD TO STABILIZE LITHIUM / CARBON MONOFLUORIDE BATTERY DURING STORAGE

(71) Applicant: Cardiac Pacemakers, Inc., St. Paul, MN (US)

(72) Inventors: Ignacio Chi, Mahtomedi, MN (US); Steven P. Findell, New Brighton, MN (US); Todd Eric Bofinger, Shoreview, MN (US); Michael J. Root, Lino Lakes, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 287 days.

(21) Appl. No.: 14/789,373

(22) Filed: Jul. 1, 2015

(65) Prior Publication Data

US 2016/0013489 A1 Jan. 14, 2016

Related U.S. Application Data

(60) Provisional application No. 62/021,814, filed on Jul. 8, 2014.

(51) Int. Cl.
*H01M 4/583* (2010.01)
*H01M 4/04* (2006.01)
(Continued)

(52) U.S. Cl.
CPC ......... *H01M 4/5835* (2013.01); *H01M 4/049* (2013.01); *H01M 4/08* (2013.01);
(Continued)

(58) Field of Classification Search
CPC ............ H01M 4/049; H01M 10/0569; H01M 10/0567; H01M 10/052; H01M 4/5835; H01M 4/08; H01M 6/168; H01M 4/583; H01M 6/164; H01M 2220/30; H01M 2300/0028
(Continued)

(56) References Cited

U.S. PATENT DOCUMENTS 4,465,747 A 8/1984 Evans
4,478,921 A 10/1984 Langan
(Continued)

FOREIGN PATENT DOCUMENTS

AU 2015288159 B2 1/2019
CN 102668170 A 9/2012
(Continued)

OTHER PUBLICATIONS

Fateev, S. A., "Life Tests of Lithium/Fluorocarbon Cells", Russian Journal of Electrochemistry, vol. 36, No. 7, (2000), 778-783.
(Continued)

*Primary Examiner* — Gary D Harris
(74) *Attorney, Agent, or Firm* — Schwegman Lundberg & Woessner, P.A.

(57) ABSTRACT

A method includes treating a CFx material with a base during the formation of a CFx cathode; and assembling the treated CFx material into a cathode electrode and assembling the cathode electrode with a lithium anode electrode and an electrolyte into a cell.

19 Claims, 2 Drawing Sheets

(51) Int. Cl.
- *H01M 4/08* (2006.01)
- *H01M 6/16* (2006.01)
- *H01M 10/0567* (2010.01)
- *H01M 10/0569* (2010.01)
- *H01M 10/052* (2010.01)

(52) U.S. Cl.
CPC ........... *H01M 4/583* (2013.01); *H01M 6/164* (2013.01); *H01M 6/168* (2013.01); *H01M 10/052* (2013.01); *H01M 10/0567* (2013.01); *H01M 10/0569* (2013.01); *H01M 2220/30* (2013.01); *H01M 2300/0028* (2013.01)

(58) Field of Classification Search
USPC ........................................................ 29/623.1
See application file for complete search history.

(56) References Cited

U.S. PATENT DOCUMENTS

| | | | |
|---|---|---|---|
| 4,913,988 | A | 4/1990 | Langan |
| 5,308,714 | A | 5/1994 | Crespi |
| 5,474,858 | A | 12/1995 | Merritt |
| 7,503,943 | B2 | 3/2009 | Tsukamoto et al. |
| 7,807,300 | B2 | 10/2010 | Merritt et al. |
| 8,349,489 | B2 | 1/2013 | Morita et al. |
| 2006/0115738 | A1 | 6/2006 | Sazhin et al. |
| 2008/0085449 | A1* | 4/2008 | Pyszczek ............ H01M 2/0404 429/129 |
| 2010/0266907 | A1* | 10/2010 | Yazami ................ H01M 4/368 429/405 |
| 2011/0123874 | A1* | 5/2011 | Issaev ..................... H01M 2/14 429/338 |
| 2012/0171574 | A1* | 7/2012 | Zhamu ..................... H01M 4/13 429/300 |
| 2013/0065137 | A1* | 3/2013 | Ndzebet ............... H01M 4/485 429/335 |
| 2013/0106029 | A1* | 5/2013 | Snyder .................. H01M 4/043 264/571 |

FOREIGN PATENT DOCUMENTS

| | | | |
|---|---|---|---|
| CN | 103022455 | A | 4/2013 |
| CN | 103403922 | A | 11/2013 |
| CN | 104085882 | A | 10/2014 |
| CN | 106663806 | A | 5/2017 |
| EP | 3167501 | B1 | 8/2018 |
| JP | 5358622 | A | 5/1978 |
| JP | 56038774 | A | 4/1981 |
| JP | 5986155 | A | 5/1984 |
| JP | 59086155 | A * | 5/1984 .......... H01M 4/5835 |
| JP | 59087762 | A | 5/1984 |
| JP | 8173194 | A | 7/1996 |
| JP | 2003257426 | A | 9/2003 |
| JP | 2003281932 | A | 10/2003 |
| JP | 2006523368 | A | 10/2006 |
| JP | 2010202455 | A | 9/2010 |
| JP | 2010539515 | A | 12/2010 |
| JP | 2011198771 | A | 10/2011 |
| JP | 2012018832 | A | 1/2012 |
| JP | 2012074133 | A | 4/2012 |
| JP | 2014506381 | A | 3/2014 |
| JP | 2017523564 | A | 8/2017 |
| JP | 6454740 | B2 | 12/2018 |
| WO | WO-2002082569 | A1 | 10/2002 |
| WO | WO-2012087698 | A1 | 6/2012 |
| WO | WO-2016007349 | A1 | 1/2016 |

OTHER PUBLICATIONS

"European Application Serial No. 15744762.4, Response filed Aug. 2, 2017 to Communication Pursuant to Rules 161(1) and 162 EPC dated Feb. 15, 2017", 7 pgs.
"International Application Serial No. PCT/US2015/038791, International Preliminary Report on Patentability dated Jan. 19, 2017", 8 pgs.
"International Application Serial No. PCT/US2015/038791, International Search Report dated Sep. 28, 2015", 4 pgs.
"International Application Serial No. PCT/US2015/038791, Written Opinion dated Sep. 28, 2015", 7 pgs.
Dia, Y, et al., "Surface modified CFx cathode material for ultrafast discharge and high energy density", Jurnal of materials chemistry a 20141228 royal society of chemistry GBR, vol. 2, Nr. 48, XP002743788, (Dec. 28, 2014), 20896-20901.
Stine, R, et al., "High-density amine-terminated monolayers formed on fluorinated CVD-grown graphene", Langmuir May 29, 2012 american chemical society USA, vol. 28, Nr. 21, XP002744052, (May 29, 2012), 7957-7961.
"Australian Application Serial No. 2015288159, First Examiners Report dated Nov. 30, 2017", 3 pgs.
"Japanese Application Serial No. 2016-574433, Office Action dated Oct. 3, 2017", with translation, 11 pgs.
"Japanese Application Serial No. 2016-574433, Response filed Dec. 15, 2017 to Office Action dated Oct. 3, 2017", w/ claims in English, 9 pgs.
"Australian Application Serial No. 2015288159, Response filed Jun. 20, 2018 to Subsequent Examiners Report dated Mar. 27, 2018", 8 pgs.
"Australian Application Serial No. 2015288159, Response filed Aug. 17, 2018 to Subsequent Examiners Report dated Jun. 26, 2018", 9 pgs.
"Australian Application Serial No. 2015288159, Subsequent Examiners Report dated Jun. 26, 2018", 3 pgs.
"Chinese Application Serial No. 201580036863.7, Office Action dated Aug. 31, 2018", W/ English Translation, 22 pgs.
"Japanese Application Serial No. 2016-574433, Response filed Jun. 11, 2018 to Office Action dated Mar. 13, 2018", W/ English claims, 7 pgs.
"Australian Application Serial No. 2015288159, Response filed Mar. 21, 2018 to First Examiners Report dated Nov. 30, 2017", 10 pgs.
"Australian Application Serial No. 2015288159, Subsequent Examiners Report dated Mar. 27, 2018", 3 pgs.
"Japanese Application Serial No. 2016-574433, Office Action dated Mar. 13, 2018", w/ English translation, 12 pgs.
"Chinese Application Serial No. 201580036863.7, Response filed Jan. 3, 2019 to Office Action dated Aug. 31, 2018", w/ English claims, 10 pgs.

* cited by examiner

METHOD TO STABILIZE LITHIUM / CARBON MONOFLUORIDE BATTERY DURING STORAGE

CLAIM OF PRIORITY

This application claims the benefit of priority under 35 U.S.C. § 119(e) of U.S. Provisional Patent Application Ser. No. 62/021,814, filed on Jul. 8, 2014, which is herein incorporated by reference in its entirety.

BACKGROUND

A pulse generator (implantable medical device or IMD), such as a cardiac rhythm management device, can include a sealed housing containing various electronic and electrochemical components. For example, batteries are often needed in implantable devices.

Some batteries, such as lithium/carbon monoflouride (Li/CFx) batteries, can develop an increase in battery resistance after storage of the battery. This can result in a lower loaded voltage.

SUMMARY

In example 1, this document describes a method comprising treating a CFx material with a base during the formation of a CFx cathode; and assembling the treated CFx material into a cathode electrode and assembling the cathode electrode with a lithium anode electrode and an electrolyte into a cell.

In example 2, the subject matter of example 1 can optionally include wherein the base can include a LiOH.

In example 3, the subject matter of any of examples 1 or 2 can optionally include wherein the base includes a KOH.

In example 4, the subject matter of any of examples 1-3 can optionally include wherein the base includes a polymeric organic base.

In example 5, the subject matter of example 4 can optionally include wherein the polymeric organic base includes an amine including $H_2N-(CH_2)n-NH_2$, or $H_2N-[(CH_2)n-NH-(CH_2)n]m-NH_2$.

In example 6, the subject matter of example 4 optionally include wherein the polymeric organic base includes a pyridine or an imidazole.

In example 7, the subject matter of example 6 can optionally include wherein the polymeric organic base includes poly-4-vinylpyridine or poly-1-vinylimidazole.

In example 8, the subject matter of any of examples 1-7 can optionally include wherein the base includes an anionic salt.

In example 9, the subject matter of example 8 can optionally include wherein the anionic salt includes $Li_2SiO_3$, $Li_2B_4O_7$, $Li_2CO_3$, or $Li_3PO_4$.

In example 10, the subject matter of any of examples 1-9 can optionally include wherein the base includes a metal oxide.

In example 11, the subject matter of example 10 can optionally include wherein the metal oxide includes $Li_2O$ or $Al_2O_3$.

In example 12, the subject matter of any of examples 1-11 can optionally include wherein treating the CFx material includes mixing the base and the CFx material during a neutralization process.

In example 13, the subject matter of any of examples 1-12 can optionally include wherein treating the CFx material includes mixing the base and the cathode material during a cathode manufacturing process.

In example 14, the subject matter of any of examples 1-13 can optionally include wherein treating the CFx material is performed during both a neutralization process and a cathode manufacturing process.

In example 15, a method includes: treating a CFx material with a base during a neutralization process of forming a cathode; further treating the treated CFx material with a base during a cathode manufacturing process where additives are added to the treated CFx material to form a cathode powder; assembling the cathode powder into a cathode; and forming a battery cell by assembling the cathode and a lithium anode and an electrolyte into a housing.

BRIEF DESCRIPTION OF THE FIGURES

The drawings illustrate generally, by way of an example, but not by a way of limitation, various embodiments discussed in the present document.

DETAILED DESCRIPTION

Figure 1:
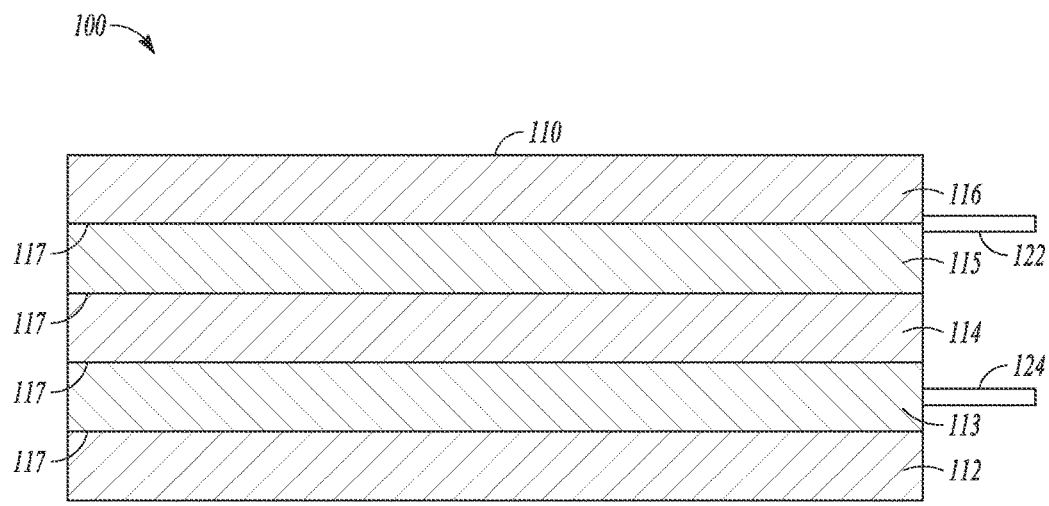
FIG. 1 shows a schematic cross-section of a battery, in accordance with one embodiment.

FIG. 1 shows a schematic cross-section of a battery 100, in accordance with one embodiment. The battery 100 can be used in an implantable medical device or for other uses, for example. In this example, the battery includes a housing 110 that can be formed of a metal, for example. Within the housing 110 are a series of alternating anodes 112, 114, 116 and cathodes 113, 115. Each adjacent anode and cathode are separated by a separator 117, such as micro-porous polypropylene, or polyethylene, (or a combination of both), for example. The anodes 112, 114, 116 are connected together and connected to a terminal 122. The cathodes 113, 115 are connected together and connected to a terminal 124. Either one of or both of terminals 122, 124 can be insulated from the housing 110. The housing is filled with an electrolyte solvent, such as dimethoxy ethane (DME).

In some embodiments, the battery 100 is a Li/CFx battery where the anodes 112, 114, 116 include lithium and the cathodes include CFx (e.g., for example, where x can be between 0.5 and 1.1). In some examples, the CFx is treated with a base at one or more steps of the cathode building process in order to neutralize acidic sites in CFx which can degrade the DME solvent in the electrolyte. Treating the CFx with a base can prevent degradation products from forming the DME, which can lead to a film being formed on the cathode, increasing its resistance. In addition, the degraded DME products can also migrate to the anode where the lithium can reduce the DME degradation products, resulting in higher anode resistance and in an overall increase in cell resistance.

Figure 2:
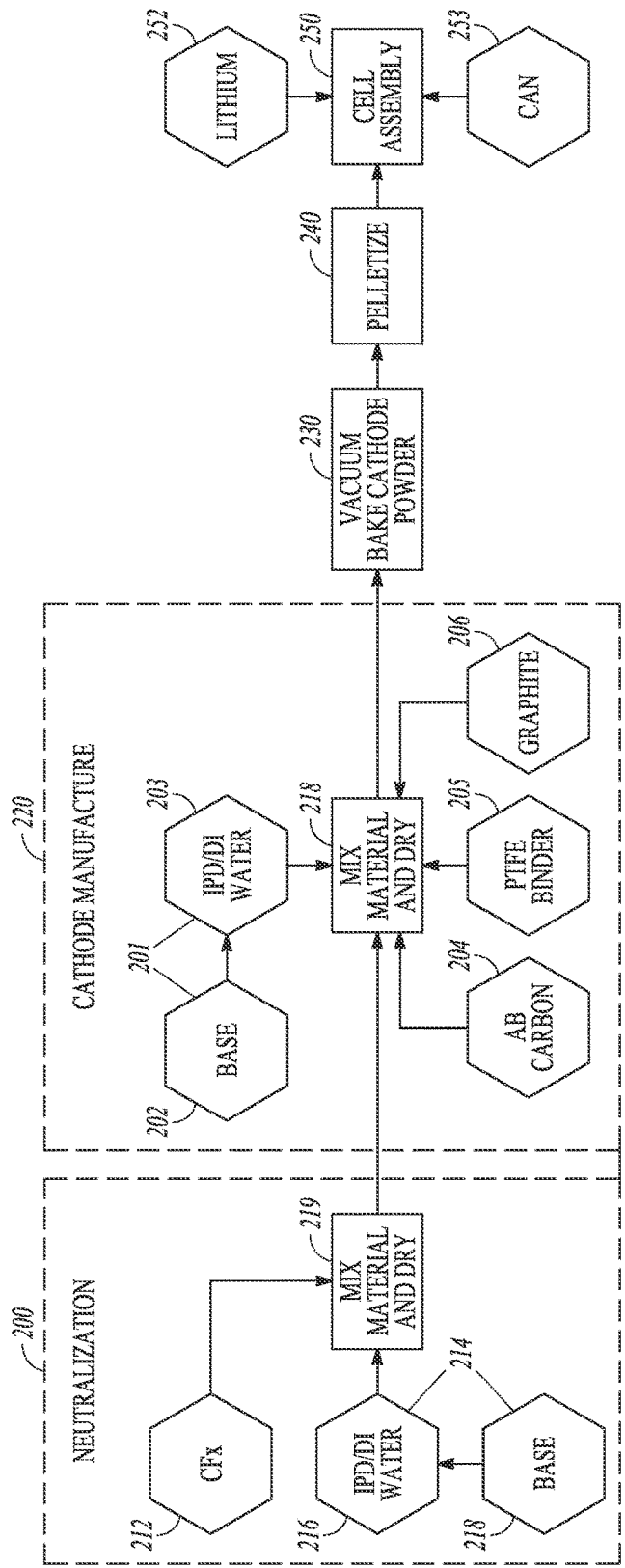
FIG. 2 shows an example of a process flow for manufacturing a battery, in accordance with one embodiment.

FIG. 2 shows an example of a process flow for manufacturing a battery 100, in accordance with some embodiments of the present disclosure. In FIG. 2 the process is broken down schematically to show five basic steps, a neutralization step 200, a cathode manufacture step 220, a vacuum bake cathode powder step 230, a pelletize step 240, and a cell assembly step 250. In some examples, one or more of these steps can be omitted.

In one example of a process flow, in the neutralization step 200, the CFx 212 is mixed with a base solution 214. The base solution 214 can include the base 218 and an isopropyl alcohol (IPA)/dionized (DI) water mixture 216. In one embodiment, lithium hydroxide (LiOH) is used as the base used for neutralization.

In such embodiments, a 0.5 molar (M) LiOH solution is used to neutralize the acidic sites on the CFx and to have some additional base to neutralize any additional acidic sites that may become present during the discharge of the cell. For example, 100 grams (g) of CFx 212 can be mixed with a 0.5M LiOH solution (500 milliliters (ml), 80% by vol. deionized (DI) water and 20% by vol. Isopropyl alcohol). In one example, the mixture 219 is stirred for 4 to 6 hours. The final pH of the mixture 219 is about 12.5. The CFx mixture 219 is then filtered with a Buchner funnel and a Whatman #1 filter. The resulting CFx cake is then dried at 120° C. in a forced air or vacuum oven.

In one example, in the cathode manufacturing step 220, the CFx cathode (83% CFx/10% Acetylene black/7% PTFE, as one example) can be made as follows. The base 202 (for example, LiOH) is mixed with DI water and stirred to dissolve. IPA is added to the mixture and the neutralized CFx from the neutralization step 200 is added. The solution is mixed and dried. Then further base 202 is mixed with DI water and dissolved. Then, the CFx, AB carbon 204, and base/DI water/IPA solution 201 are mixed together.

Then PTFE binder 205 can be mixed together with the CFx/AB slurry. The mixture is dried and cooled. The dried cake is broken up, blended, and sieved one or more times until a cathode powder results. The cathode powder is baked and vacuum dried 230. The cathode powder can be pressed into pellets 240 if desired. The cathode powder or pellets are formed into a cathode by pressing or otherwise combining with a current collector.

Treating the CFx with a base and having base present in the DI water/IPA solution during the cathode powder process results in a cell that will remain stable, in terms of resistance, during multiple storage periods at elevated temperature, because of the base reacting with the CFx.

In various examples, depending on the quality of the original CFx material, for example, treating the CFx material with a base can be omitted in either the neutralization step 200 or the cathode manufacturing step 220, because enough residual base can be present to react with the CFx to prevent further degradation.

In one example, in the cell assembly step 250, the cells can be formed having two cathodes formed of the CFx cathode material described herein and three anodes formed including lithium. One example includes two layers of separator in between the anodes and cathodes. The anodes and cathodes can be placed in the housing 252. An electrolyte can be added to the housing. In some embodiments, the electrolyte can be a 1M LIBF4 in Gammabutyrolactone/DME (50/50 by vol.).

In one example, the electrolyte can also include an additive such as 3,5-Dimethylisoxazole (DMI), which can scavenge acidic species. For example, the additive can include 1M LiBF4 in Gamma butyrolactone (GBL)/1,2 Dimethoxyethane (DME) (1:1 by vol.) with 0.5% by wt. DMI.

In addition to the above example, other forms of neutralizers can be used. For example, acids can be neutralized using proton acceptors, also called bases or buffers that take up the proton forming a salt. The use of neutralizers can remove undesirable amounts of acid species in some materials. An example of this process is the use of LiOH or KOH to neutralize residual acid in electrolytically produced manganese dioxide, which can be produced from the CFx reacting with the electrolyte.

Another example of a neutralization process is the neutralization of hydrofluoric acid (HF), with lithium hydroxide. The process is shown by the following chemical reaction:

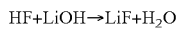

As shown, the proton from the acidic HF combines with the hydroxide group in the base LiOH to form the salt LiF and water.

In other examples, other bases can be used that do not form water as a reaction product. These include organic bases that are soluble in the electrolyte.

Another alternative is to use insoluble, polymeric organic bases to neutralize the acidic species that exist or are formed. The polymer organic bases can be included in the cathode mixture, for example. The result is a polymeric salt that is already a solid and does not precipitate in a way that will close pores. Examples of polymeric organic bases include, but are not limited to, amines such as $H_2N-(CH_2)n-NH_2$ and $H_2N-[(CH_2)n-NH-(CH_2)n]m-NH_2$, pyridines such as poly-4-vinylpyridine, imidazoles such as poly-1-vinylimidazole, and similar compounds that function as proton bases or buffering agents with a relatively high acid dissociation constant, pKa. The polymers can, for example, be single chain, linear or branching, crosslinked or copolymers.

Another alternative to neutralize acidic species can be to use insoluble, anionic metal salts and metal oxides. Lithium ion is the cation of the anionic metal salts. The result of using insoluble, ionic metal salts and metal oxides is a compound that is already a solid and does not precipitate in a way that will close pores. An example of anionic metal salts includes, but is not limited to, $Li_2SiO_3$, $Li_2B_4O_7$, $Li_2CO_3$, or $Li_3PO_4$. Some examples of metal oxides include, but are not limited to, $Li_2O$ Or $Al_2O_3$.

The metal salts, metal oxides, or combinations of these additives discussed herein can be mixed directly with the cathode material. These additives can be added in quantities that effectively neutralize acid species yet do not significantly affect the performance of the battery. Moreover, it can further help if the binder contains appropriate groups that function as proton bases or buffering agents. This can limit the amounts of materials that are not electrochemically active in the cathode.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. The above description is intended to be illustrative, and not restrictive. The above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:
   treating a CFx material with a base during the formation of a CFx cathode and having the base present in a isopropyl alcohol/deionized water solution; and
   assembling the treated CFx material into a cathode electrode by mixing further additives with the treated CFx material and assembling the cathode electrode with a lithium anode electrode and an electrolyte into a cell;
   wherein treating the CFx material with the base is done before assembling the treated CFx material into the cathode by mixing further additives with the treated CFx material such that acidic groups in the CFx material are neutralized before the cathode is assembled.

2. The method of claim 1, wherein the base includes a LiOH.

3. The method of claim 1, wherein the base includes a KOH.

4. The method of claim 1, wherein the base includes a polymeric organic base.

5. The method of claim 4, wherein the polymeric organic base includes an amine including $H_2N-(CH_2)n-NH_2$, or $H_2N-[(CH_2)n-NH-(CH_2)n]m-NH_2$, where n and m are greater than zero.

6. The method of claim 4, wherein the polymeric organic base includes a pyridine or an imidazole.

7. The method of claim 6, wherein the polymeric organic base includes poly-4-vinylpyridine or poly-1-vinylimidazole.

8. The method of claim 1, wherein the base includes an anionic salt.

9. The method of claim 8, wherein the anionic salt includes $Li_2SiO_3$, $Li_2B_4O_7$, $Li_2CO_3$, or $Li_3PO_4$.

10. The method of claim 1, wherein the base includes a metal oxide.

11. The method of claim 10, wherein the metal oxide includes $Li_2O$ or $Al_2O_3$.

12. The method of claim 1, wherein treating the CFx material includes mixing the base and the CFx material during a neutralization process of the CFx material.

13. The method of claim 1, wherein treating the CFx material further includes mixing the base and the cathode material during a cathode manufacturing process.

14. The method of claim 1, wherein treating the CFx material is performed during both a neutralization process of the CFx material and a cathode manufacturing process.

15. The method of claim 1, wherein the electrolyte includes dimethoxyethane or 3,5-Dimethylisoxazole.

16. A method comprising:
    treating a CFx material with a base during the formation of a CFx cathode and having the base present in a isopropyl alcohol/deionized water solution; and
    assembling the treated CFx material into a cathode electrode and assembling the cathode electrode with a lithium anode electrode and an electrolyte into a cell;
    wherein treating the CFx material with the base is done before assembling the treated CFx material into the cathode such that acidic groups in the CFx material are neutralized before the cathode is assembled, wherein after treating the CFx material with the base the CFx material has a final pH of about 12.5.

17. A method comprising:
    treating a CFx material with a base during a neutralization process of forming a cathode;
    further treating the treated CFx material with a base during a cathode manufacturing process where additives are added to the treated CFx material to form a cathode powder;
    assembling the cathode powder into a cathode, wherein treating the CFx material with the base is done before assembling the cathode powder into the cathode such that acidic groups in the CFx material are neutralized before the cathode is assembled, wherein after treating the CFx material with the base the CFx material has a final pH of about 12.5; and
    forming a battery cell by assembling the cathode and a lithium anode and an electrolyte into a housing.

18. The method of claim 17, wherein the base includes LiOH.

19. The method of claim 17, wherein the electrolyte includes dimethoxyethane or 3,5-Dimethylisoxazole.

\* \* \* \* \*